(12) United States Patent
Dengler et al.

(10) Patent No.: US 10,471,376 B2
(45) Date of Patent: Nov. 12, 2019

(54) FILTER ASSEMBLY

(71) Applicant: DEERE & COMPANY, Moline, IL (US)

(72) Inventors: Marcos Dengler, Rio Grande do Sul (BR); Alexandre Schneider, Rio Grande do Sul (BR)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/467,700

(22) Filed: Mar. 23, 2017

(65) Prior Publication Data

US 2017/0326483 A1  Nov. 16, 2017

(30) Foreign Application Priority Data

May 13, 2016  (DE) .................. 10 2016 208 354

(51) Int. Cl.
| | |
|---|---|
| *B01D 35/30* | (2006.01) |
| *B01D 29/52* | (2006.01) |
| *B01D 27/08* | (2006.01) |
| *B01D 27/14* | (2006.01) |
| *F02M 37/22* | (2019.01) |

(52) U.S. Cl.
CPC .......... *B01D 35/306* (2013.01); *B01D 27/08* (2013.01); *B01D 27/142* (2013.01); *B01D 29/52* (2013.01); *B01D 2201/4023* (2013.01); *F02M 37/22* (2013.01)

(58) Field of Classification Search
CPC .. B01D 27/14; B01D 27/142; B01D 29/0047; B01D 29/009; B01D 29/005; B01D 29/52; B01D 35/30; B01D 35/301; B01D 35/303; B01D 35/306
See application file for complete search history.

(56) References Cited

U.S. PATENT DOCUMENTS

| | | | | |
|---|---|---|---|---|
| 2,095,447 A | * | 10/1937 | Lentz ................. | B01D 35/12 137/625.43 |
| 2,978,108 A | * | 4/1961 | Strassheim ........... | B01D 35/30 210/333.01 |

(Continued)

FOREIGN PATENT DOCUMENTS

| | | |
|---|---|---|
| DE | 3739614 A1 | 6/1989 |
| DE | 202011005359 U1 | 10/2011 |
| KR | 101591007 B1 | 2/2016 |

OTHER PUBLICATIONS

European Search Report issued in counterpart application No. 17170646.8 dated Oct. 12, 2017. (7 pages).

(Continued)

*Primary Examiner* — David C Mellon

(57) ABSTRACT

A filter assembly for fluidic connection at a function port includes a connection base having a base inlet and a base outlet, the base inlet being fluidly connected to supply channels for supplying a fluid to cartridge inlets of at least two filter cartridges, and the base outlet being fluidly connected to discharge channels to discharge the fluid from cartridge outlets of the filter cartridges. The connection base with the base inlet and the base outlet has a fluidic connection structure corresponding to the filter cartridge with the cartridge inlet and the cartridge outlet such that the connection base or a filter cartridge is fluidly connected at the function port.

15 Claims, 3 Drawing Sheets

(56) References Cited

U.S. PATENT DOCUMENTS

| | | | | |
|---|---|---|---|---|
| 3,900,401 A * | 8/1975 | Oliver | ............... | B01D 35/12 |
| | | | | 210/238 |
| 4,552,662 A | 11/1985 | Webster et al. | | |
| 6,197,195 B1 * | 3/2001 | Booth | ............... | B01D 29/35 |
| | | | | 210/340 |
| 2012/0273433 A1 * | 11/2012 | Wessels | ............ | B01D 29/52 |
| | | | | 210/767 |
| 2017/0028319 A1 * | 2/2017 | Dong | ............... | C02F 1/001 |

OTHER PUBLICATIONS

German Search Report in foreign counterpart application No. 102016208354.6 dated Dec. 28, 2016 (8 pages).

\* cited by examiner

FILTER ASSEMBLY

RELATED APPLICATIONS

This application claims the benefit of German Application Ser. No. 102016208354.6, filed on May 13, 2016, the disclosure of which is hereby expressly incorporated by reference in its entirety.

FIELD OF THE DISCLOSURE

The present disclosure relates to a filter assembly.

BACKGROUND

A conventional filter assembly with two filter cartridges is known in the art. The filter assembly is fluidly connected to a connection port of a fuel tank and a connection port of a stationary diesel engine. Here a socket part of the filter assembly has an inlet and an outlet, which are each designed as connection sockets for specially routed fuel lines. The socket part contains a plurality of channels, which fluidly connect the inlet and the outlet to the filter cartridges.

SUMMARY

In one embodiment of the present disclosure, a filter assembly serves for fluidic connection to a function port, which in particular is the port for a technical device (e.g., a fuel pump). The filter assembly has a connection base with a base inlet and a base outlet. The base inlet is fluidly connected to supply channels to conduct the fluid (e.g., fuel) from the function port to cartridge inlets of at least two filter cartridges. The base outlet is fluidly connected to discharge channels to conduct the filtered fluid from the cartridge outlets of the filter cartridges to the base outlet.

The connection base with the base inlet and the base outlet has a fluidic connection structure that corresponds to the connection structure of the filter cartridge with the cartridge inlet and the cartridge outlet. This correspondence is such that either the connection base or a single filter cartridge can optionally (i.e., interchangeably) be fluidly connected at the associated function port.

The base inlet and the base outlet of the connection base are dimensioned similarly or identically in relation to the cartridge inlet and the cartridge outlet of a filter cartridge. This applies at least in segments, for example, along an axial direction of the filter cartridge and the connection base and/or transverse to said axial direction.

In particular, the geometric or constructive dimensioning of the connection base and a filter cartridge are matched to each other with regard to their fluidic connections so that the base inlet and base outlet, on the one hand, and the cartridge inlet and cartridge outlet, on the other, have identical geometric measurements at least in part.

Thus, a single filter cartridge can optionally be exchanged at the function port for the connection base with several filter cartridges. In other words, the geometric or constructive dimensioning of the connection base and a filter cartridge are matched to each other in relation to their fluidic connections so that either a single filter cartridge or the connection base with at least two filter cartridges can be fluidly connected to at the same function port without additional expensive technical or constructive adaptations.

A filter assembly having such a connection base provides a user with more flexibility for filtering fluid according to requirement and specific application. For example, when necessary, by means of the connection base, the filtration capacity can be increased over the capacity of a single filter cartridge without additional technical measures. Through this, the efficiency and performance of the filter function can be increased in many applications without having to make available other, correspondingly more expensive, types of filter cartridges. These more flexible possibilities for filtration are possible with a single traditional type of filter cartridge and the connection base.

The connection base acts as an adapter between the filter cartridges and the function port. By means of said adapter, at least two filter cartridges can be fluidly connected at the same function port, i.e., instead of just one filter cartridge as is traditional. In each case, according to the design of the connection base it is also possible for more than two filter cartridges to be fluidly connected to the function port at the same time following the same principle.

It should be noted that the mention of a base outlet or a cartridge outlet also includes a variation with a plurality (e.g., two) such openings or outlets. This also applies to the mention of a base inlet or cartridge inlet.

The base inlet is the entrance or at least a component of a central supply segment of the connection base, which ends in at least two branching supply channels. In particular, a filter cartridge is associated with each supply channel. This design of the connection base creates the prerequisite for a space-saving, compact construction of the entire filter assembly, so that it can be used in the region of a function port even when there are particularly restricted space conditions.

In particular, the central supply segment and two branching supply channels are disposed as a kind of Y divider. This supports the desired compact construction of the filter assembly through a space-saving relative arrangement between the connection base and at least two filter cartridges.

In a further embodiment, the cartridge inlet of a filter cartridge and an associated supply channel are coaxially disposed. This relative arrangement facilitates an easy installation of the filter cartridges at the connection base. In particular, the filter cartridges can be installed on the connection base in the same way as a single filter cartridge is traditionally installed directly on the function port. This supports an installation-friendly manipulation of the connection base.

The central supply segment of the connection base is a component of a tubular connector piece, which can be provided cheaply.

Advantageously, the connector piece has at least one orifice opening (for example, an annular gap-like opening or a plurality of openings) and is surrounded by a base body that contains the supply channels, where the supply channels are fluidly connected to the base inlet via the at least one orifice opening of the connector piece. This design supports a construction-wise simple structure of the connection base. In particular, through this the connection base can be assembled in kit fashion from individual, easily made components.

With such a kit-like structure, the connector piece and the base body are detachably connected to each other. This facilitates the manipulation of the connection base in maintenance or repair operations.

In another embodiment, the connection piece and the base body are concentrically disposed and can be rotated relative to each other. This supports an installation-friendly manipulation of the individual components of the connection base and their installation or demounting. In addition, the relative rotatability between the connection piece and the base body allows an orientation of the base body, and thus the connected filter cartridges, that is independent of the spatial position and that is the most advantageous in each case.

During the installation of the filter assembly at a function port, a set relative position, in particular a rotary position, can be locked between the connector piece and the base body. This locking can in particular be loosened again in order to facilitate simple demounting of the filter assembly from the function port.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

DETAILED DESCRIPTION

Figure 1:
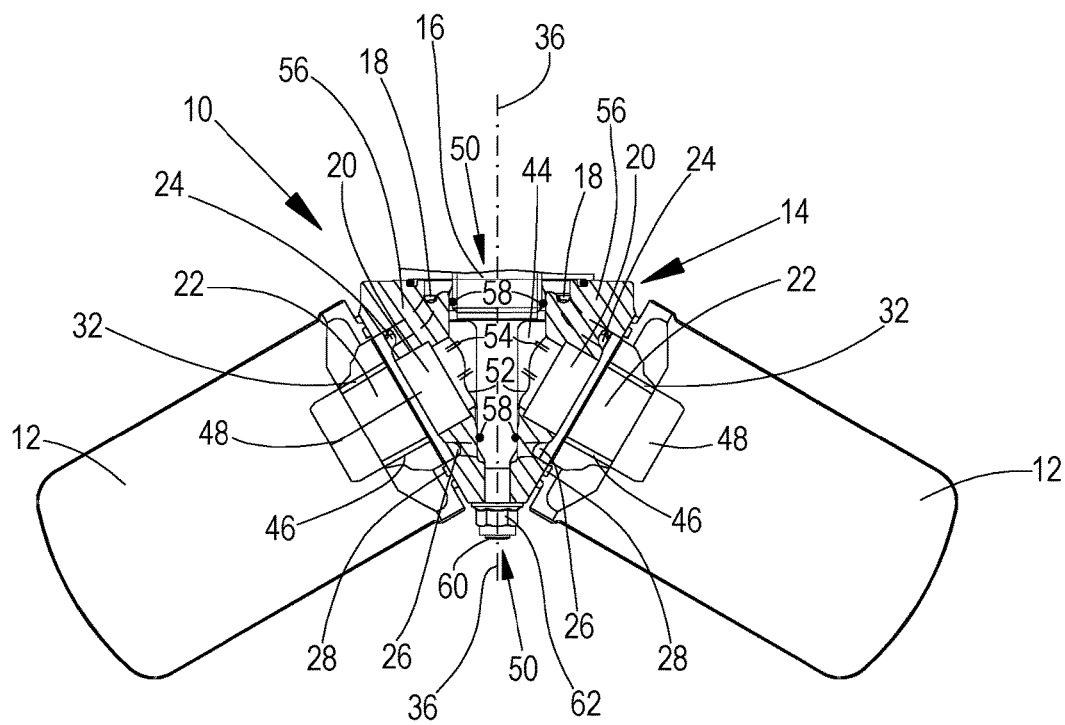
FIG. 1 is a side view of a filter assembly.

In FIG. 1, a filter assembly 10 is shown. It contains two traditional filter cartridges 12. In other embodiments, more than two filter cartridges 12 can also be provided. The filter assembly 10 additionally contains a connection base 14, which has a base inlet 16 and a base outlet 18. The base inlet 16 is fluidly connected to supply channels 20. A fluid that is to be filtered, in particular fuel, is conducted through these supply channels 20 to a cartridge inlet 22 of each filter cartridge 12. The base outlet is divided and ends in two discharge channels 24. Each discharge channel 24 is fluidly connected to an additional discharge channel 26 in a way that is not shown in more detail here. Each discharge channel 24 or 26 is fluidly connected to a cartridge outlet 28 of the filter cartridges 12. The filtered fluid is discharged through these cartridge outlets 28.

Figure 2:
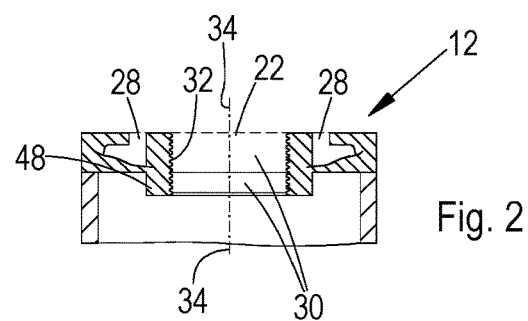
FIG. 2 is a partial side view of a filter cartridge.

The arrangement of the cartridge inlet 22 and the cartridge outlet 28 can easily be seen in the partial sectional view of the filter cartridge 12 in FIG. 2. The cartridge inlet 22 is a component of a hollow, cylindrical receiver space 30, which axially, at least in a segment, has a cartridge internal thread 32 on its wall. The cartridge internal thread 32 serves to install the filter cartridge 12 for operational use. In FIG. 2, the cartridge internal thread 32 extends axially up to a connection ring 48. In other embodiments, the connection ring 48 can also be made without an internal thread, so that the cartridge internal thread 32 extends axially beyond the connection ring 48.

It should be noted that base outlet 18 can also mean a plurality of base outlets 18. Likewise, cartridge outlet 28 can also mean a plurality of cartridge outlets 28.

The cartridge inlet 22 is concentrically disposed in relation to a central lengthwise axis 34 of the filter cartridge 12. The base inlet 16 is concentrically disposed in relation to a central lengthwise axis 36 of the connection base 14. At least in one cross-sectional plane running transverse to the central lengthwise axes 34 and 36, the base inlet 16 and the base outlet 18, on the one hand, and the cartridge inlet 22 and the cartridge outlet 28, on the other, are correspondingly disposed and dimensioned in relation to each other, in particular in the same way or identically. Consequently, the connection base 14 together with the base inlet 16 and the base outlet 18, has a fluidic connection structure that corresponds to the connection structure of the filter cartridge 12 with the cartridge inlet 22 and the cartridge outlet 28. With respect to the relevant central lengthwise axis 34, 36, the base inlet 16 and the base outlet 18, on the one hand, and the cartridge inlet 22 and the cartridge outlet 28, on the other, have approximately equal spacing and dimensions. This corresponding or identical dimensioning of the base inlet 16 and the base outlet 18 in relation to the cartridge inlet 22 and the cartridge outlet 28 results in the connection base 14 with a plurality of traditional filter cartridges 12 being able to be fluidly connected, without additional technical measures, to a function port 38 (hereinafter "port 38"), which traditionally has been suitable only for a single filter cartridge 12. Through this, the filter assembly 10 with a plurality of filter cartridges 12 (FIG. 3) or a single filter cartridge 12 (FIG. 4) can optionally be fluidly connected to the port 38 with the help of the connection base 14, which acts as adapter.

Figure 3:
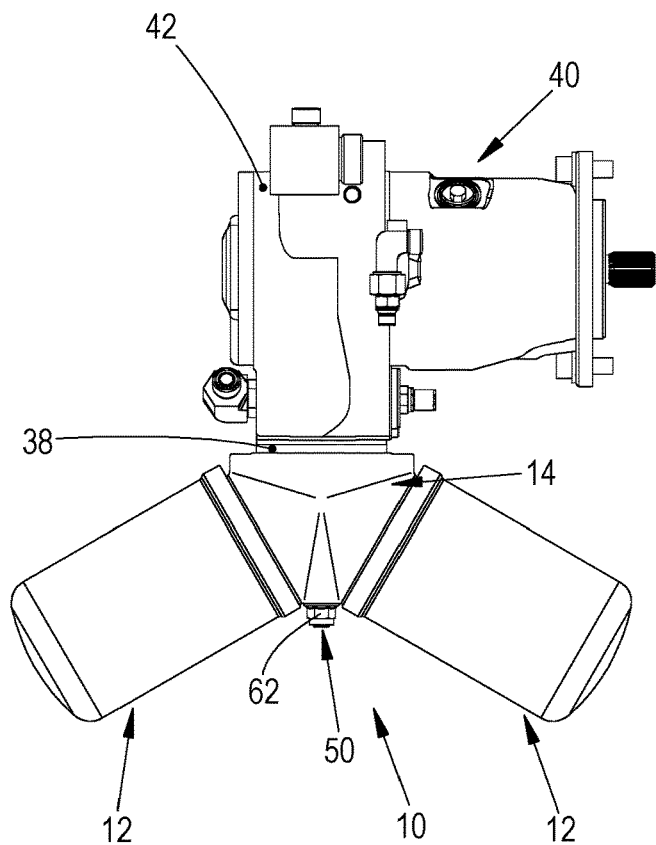
FIG. 3 is a side view of the filter assembly of FIG. 1 that has been fluidly connected at a function port.

It should also be noted by means of FIGS. 3 and 4 that the fluid port 38 in the described embodiment is a component of a fuel pump 40 (hereinafter "pump 40"), which is substantially known and therefore not explained in more detail, and is disposed on a pump housing 42. The pump 10 conveys fuel from a fuel source to a technical apparatus in order to supply said apparatus with the filtered fuel. As already mentioned, traditionally a single filter cartridge 12 is installed at the port 38 for filtration; in particular it is screwed on by means of the cartridge internal thread 32. This single filter cartridge 12 can, as desired or optionally, be exchanged for two or more than two filter cartridges 12 by using the connection base 14 as adapter for a corresponding number of filter cartridges 12.

The structure of the connection base 14 is explained below by means of FIG. 1. The base inlet 16 is a component of a central supply segment 44, which ends in two symmetrically disposed supply channels 20. Here the central supply segment 44 and the two branching supply channels 20 are space-savingly disposed as a kind of Y divider. Each of the supply channels 20 has a channel external thread 46, which corresponds to the cartridge internal thread 32.

Figure 4:
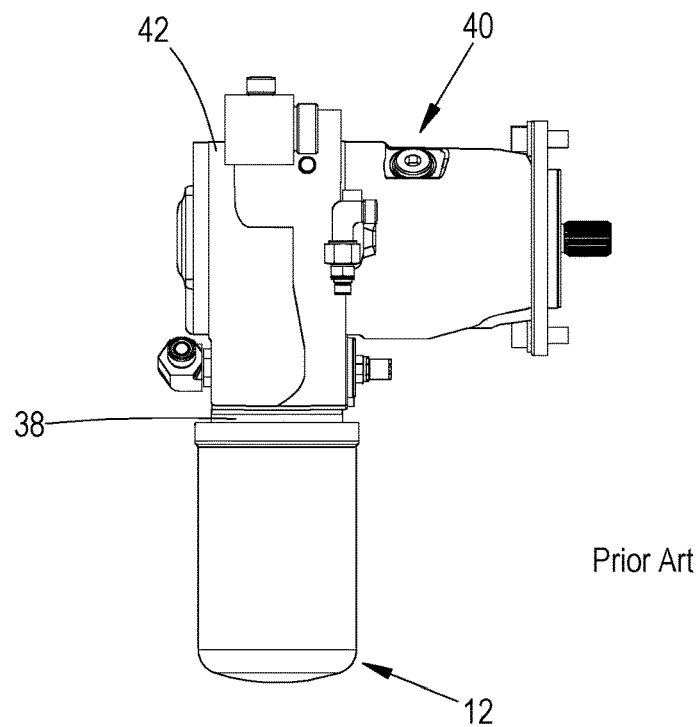
FIG. 4 is a side view of a conventional filter cartridge that is fluidly connected to the function port as in FIG. 3.

With these constructive or geometric features of the connection base 14, the filter cartridge 12 can be installed on the connection base 14 in the same way as is traditionally done at the port 38 of a technical device according to FIG. 4.

The central supply segment 44 is a component of a tubular connector piece 50, the central lengthwise axis of which corresponds to the central lengthwise axis 36. The connector piece 50 has a plurality of orifice openings 52. Together they form an annular gap, which is interrupted by a plurality of legs 54. The supply channels 20 are fluidly connected to the base inlet 16 through the orifice openings 52 or the annular gap-like orifice opening 52. In this way a kit-built connection base 14 can be made available, with the tubular connector piece 50 and a base body 56 surrounding it. The base body 56 contains the supply channels 20 and the discharge channels 24, 26.

The connector piece 50 and the base body 56 are detachably connected to each other. When this connection is made, two sealing rings 58, designed as O rings, ensure a seal in the region of the orifice opening(s) 52. The sealing rings 58 also support a stable securing of the connector piece 50 and the base body 56 relative to each other. The connector piece 50 and the base body 56 are concentrically disposed with respect to each other in the assembled state and can be rotated relative to each other, so that the filter cartridges 12 can take different spatial positions, or different rotary positions, relative to the connector piece 50. At an axial free end, the connector piece 50 has an external thread 60, which corresponds to a threaded nut 62. Through this, a desired rotary position between the connector piece 50 and the base body 56 can be detachably locked.

Figure 5:
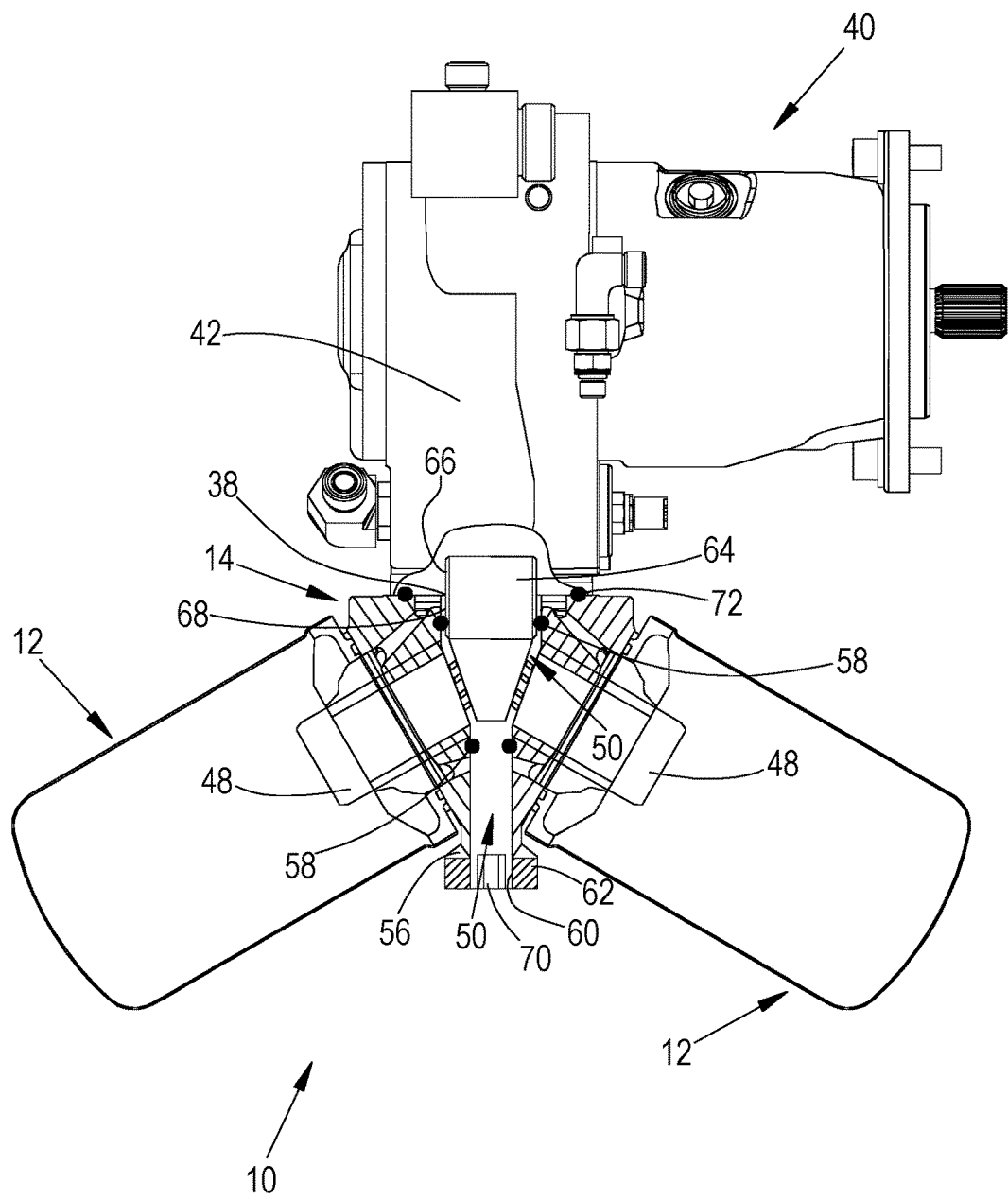
FIG. 5 is an enlarged side view of the mounting position of the filter assembly of FIG. 3.

The described construction of the connection base 14 enables a service-friendly installation of the filter assembly 10 at the port 38 with simultaneously elevated filtration power through the use of a plurality of filter cartridges 12. This is explained below by means of FIG. 5. The port 38 has a tubular connector piece 64, the external thread of which has a connector external thread 66. This connector external thread 66 traditionally corresponds to the cartridge internal thread 32 for fluidly connecting a single filter cartridge 12 at the port 38.

So that the connection base 14 can also optionally be fluidly connected at the port 38 without additional technical measures, its connector piece 50 has a connector internal thread 68 that corresponds with the connector external thread 66. First, the connector piece 50 is screwed together with the connector external thread 66 by means of its connector internal thread 68 at the port 38. To achieve the screwing operation, the free end of the connector piece 50 that is turned toward the external thread 60 has an internal polygon 70 (in particular, an internal hexagon) for a corresponding screwdriver tool. The filter cartridges 12 are screwed, by means of their cartridge internal thread 32, to the channel external thread 46 on the base body 56. Then the base body 56 is moved along the central lengthwise axis 36 and in doing so brought into a form fit connection with the connector piece 50. If necessary, the base body 56 is rotated relative to connector piece 50 until the desired spatial position of the filter cartridges 12 has been established. Said relative position between the connector piece 50 and the base body 56 is detachably locked by means of the threaded nut 62. Through this, the filter assembly 10 is in a definite mounting position. A tight seat between the base body 56 and the port 38 is supported by means of a sealing ring 72. It can be positioned outside the mounting position, for example, at the port 38 or at base body 56.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A filter assembly for fluidic connection at a function port, comprising:
a connection base having a first side, a second side opposite the first side, a base inlet disposed on the first side, and a base outlet disposed on the first side, the base inlet being fluidly connected to supply channels for supplying a fluid to cartridge inlets of at least two filter cartridges, the base outlet being fluidly connected to discharge channels to discharge the fluid from cartridge outlets of the at least two filter cartridges, and
wherein, the connection base with the base inlet and the base outlet has a fluidic connection structure corresponding to the cartridge inlets and the cartridge outlets of the at least two filter cartridges such that the connection base or a filter cartridge of the at least two filter cartridges is fluidly connected at the function port;
wherein the base inlet is a component of a supply segment of the connection base, which ends in at least two of the supply channels;
wherein the supply segment is a component of a tubular connector piece;
wherein the connector piece has at least one orifice opening and is surrounded by a base body containing the supply channels, where the supply channels are fluidly connected to the base inlet via the at least one orifice opening of the connector piece;
wherein the connector piece and the base body are concentrically disposed in relation to each other and are rotatable relative to each other.

2. The filter assembly of claim 1, wherein the supply segment and the at least two of the supply channels are disposed in a Y divider.

3. The filter assembly of claim 1, wherein one of the at least two of the supply channels is configured to be coaxially disposed with one of the cartridge inlets of the at least two filter cartridges.

4. The filter assembly of claim 1, wherein the supply segment is a central supply segment.

5. The filter assembly of claim 1, wherein the connector piece and the base body are detachably connected to each other.

6. The filter assembly of claim 1, wherein each of the connector piece and the base body comprises a threaded portion such that a relative position between the connector piece and the base body is lockable.

7. A filter connection base configured to be one of fluidly connected between a function port and a plurality of filter cartridges and removed such that one of the plurality of filter cartridges is installed directly on the function port, the filter connection base comprising:
a central supply segment having a base inlet configured to be connected at the function port and supply a fluid from the function port through the central supply segment and toward the plurality of filter cartridges;
a plurality of supply channels, each being configured to supply the fluid from the central supply segment to a cartridge inlet at a connection structure of each of the plurality of filter cartridges; and
a plurality of discharge channels, each being configured to supply the fluid from a cartridge outlet at the connection structure of each of the plurality of filter cartridges to a base outlet of the filter connection base,
the base inlet and the base outlet, and the cartridge inlet and the cartridge outlet, are configured to be identically disposed and dimensioned in relation to each other.

8. The filter connection base of claim 7, wherein the central supply segment ends at the plurality of supply channels.

9. The filter connection base of claim 7, wherein one of the plurality of supply channels is configured to be coaxially disposed with the cartridge inlet of one of the plurality of filter cartridges.

10. The filter connection base of claim 7, further comprising a connector piece configured to extend within the central supply segment and having at least one orifice opening configured to supply the fluid from the function port to the plurality of supply channels.

11. The filter connection base of claim 10, wherein the connector piece is surrounded by a base body having the plurality of supply channels.

12. The filter connection base of claim 11, wherein the connector piece and the base body are detachably connected to each other.

13. The filter connection base of claim 11, wherein the connector piece and the base body are rotatable relative to each other.

14. A filter connection base for fluidic connection of at least two filter cartridges to a function port, the filter connection base comprising:
- a base inlet disposed on a connection side of the filter connection base and fluidly connected to at least two supply channels configured to supply a fluid to a cartridge inlet of each of the at least two filter cartridges;
- a base outlet disposed on the connection side of the filter connection base and fluidly connected to at least two discharge channels configured to discharge fluid from a cartridge outlet of each of the at least two filter cartridges; and
- a fluidic connection structure formed on the connection side of the filter connection base by the base inlet and the base outlet and being configured to correspond with the cartridge inlet and the cartridge outlet of each of the at least two filter cartridges such that the filter connection base is interchangeable with each of the at least two filter cartridges to directly connect at the function port;
- a connector piece having at least one opening configured to supply the fluid from the function port to the at least two supply channels;
- wherein the connector piece is surrounded by a base body having the at least two supply channels, the connector piece and the base body being concentrically disposed and rotatable with respect to each other.

15. A filter assembly for fluidic connection at a function port, comprising:
- a connection base having a first side, a second side opposite the first side, a base inlet disposed on the first side, and a base outlet disposed on the first side, the base inlet being fluidly connected to supply channels for supplying a fluid to cartridge inlets of at least two filter cartridges, the base outlet being fluidly connected to discharge channels to discharge the fluid from cartridge outlets of the at least two filter cartridges, and
- wherein, the connection base with the base inlet and the base outlet has a fluidic connection structure corresponding to the cartridge inlets and the cartridge outlets of the at least two filter cartridges such that the connection base or a filter cartridge of the at least two filter cartridges is fluidly connected at the function port;
- wherein the base inlet is a component of a supply segment of the connection base, which ends in at least two of the supply channels;
- wherein the supply segment is a component of a tubular connector piece;
- wherein the connector piece has at least one orifice opening and is surrounded by a base body containing the supply channels, where the supply channels are fluidly connected to the base inlet via the at least one orifice opening of the connector piece;
- wherein each of the connector piece and the base body comprises a threaded portion such that a relative position between the connector piece and the base body is lockable.

\* \* \* \* \*

UNITED STATES PATENT AND TRADEMARK OFFICE
CERTIFICATE OF CORRECTION

PATENT NO. : 10,471,376 B2  
APPLICATION NO. : 15/467700  
DATED : November 12, 2019  
INVENTOR(S) : Marcos Dengler and Alexandre Schneider Page 1 of 1

It is certified that error appears in the above-identified patent and that said Letters Patent is hereby corrected as shown below:

On the Title Page

Item (72), should read:
-- (72) Inventors:
Marcos Dengler, Centro Portao, Rio Grande do Sul (BR);
Alexandre Schneider, Sao Sebastiao do Caí, Rio Grande do Sul (BR) --

Signed and Sealed this
Twenty-fourth Day of March, 2020

Andrei Iancu
*Director of the United States Patent and Trademark Office*